United States Patent
Beadles et al.

(10) Patent No.: US 10,461,791 B2
(45) Date of Patent: Oct. 29, 2019

(54) INTERFERENCE ANALYSIS IN WIRELESS NETWORKS

(71) Applicant: TELEFONAKTIEBOLAGET LM ERICSSON (PUBL), Stockholm (SE)

(72) Inventors: John Beadles, Richardson, TX (US); Natalie Carey, Plano, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 7 days.

(21) Appl. No.: 15/585,872

(22) Filed: May 3, 2017

(65) Prior Publication Data

US 2018/0323815 A1    Nov. 8, 2018

(51) Int. Cl.
*H04B 17/318*   (2015.01)
*H04B 1/12*    (2006.01)
*H04W 24/08*   (2009.01)

(52) U.S. Cl.
CPC ........... *H04B 1/123* (2013.01); *H04W 24/08* (2013.01)

(58) Field of Classification Search
CPC combination set(s) only.
See application file for complete search history.

(56) References Cited

U.S. PATENT DOCUMENTS

| | | | |
|---|---|---|---|
| 5,771,096 A * | 6/1998 | Andersen | G01J 3/45 356/451 |
| 6,754,499 B1 | 6/2004 | Smith | |
| 7,218,928 B2 | 5/2007 | Park et al. | |
| 8,107,981 B2 | 1/2012 | Byun et al. | |
| 8,804,555 B2 | 8/2014 | Turk et al. | |
| 8,908,754 B1 * | 12/2014 | Qian | H04L 25/03885 375/229 |
| 9,107,174 B2 * | 8/2015 | Senarath | H04W 72/1231 |
| 9,121,923 B2 | 9/2015 | Bull et al. | |
| 9,154,977 B2 * | 10/2015 | Kateley | H04W 24/08 |
| 2012/0236731 A1 * | 9/2012 | Beaudin | H04W 72/082 370/248 |
| 2015/0004963 A1 | 1/2015 | Vaderna et al. | |
| 2016/0255530 A1 * | 9/2016 | Li | H04W 74/0808 370/329 |
| 2017/0064564 A1 * | 3/2017 | Yun | H04B 17/318 |

FOREIGN PATENT DOCUMENTS

WO    2013066314 A1    5/2013

* cited by examiner

*Primary Examiner* — Cindy Trandai

(57) ABSTRACT

There are provided methods and systems for effectively analyzing RF interference in wireless networks, such as LTE and NR standards compliant networks, to facilitate tracking, identification, location, and repair of interference sources in such networks. According to an embodiment, a network management server receives measurement data from a plurality of measurement devices in the network. The server processes the measurement data to detect interference of one or more of a plurality of signal pattern types in the network and to generate pattern characterization data that characterizes the detected signal patterns. The server receives a user selection of a signal pattern type and selects, in response to the user selection and for display to the user, pattern characterization data that characterizes signals of the selected signal pattern type.

18 Claims, 9 Drawing Sheets

INTERFERENCE ANALYSIS IN WIRELESS NETWORKS

TECHNICAL FIELD

The disclosed subject matter relates generally to telecommunications and more particularly to certain approaches for facilitating analysis of signal patterns (e.g., interference) in wireless networks, such as LTE and NR standards compliant networks.

BACKGROUND

Cellular networks typically require that the RF spectrum over which they operate not contain undesired RF transmissions, i.e., RF interference. RF interference in wireless networks degrades the operation of those networks. In particular, RF interference can cause the cell phones to drop calls, use undesirably high RF power, use excess network capacity, and generally cause an undesirable user experience. Thus, sources of interference need to be identified, tracked and eliminated to protect the operation of the network.

Cellular systems generally contain certain features to measure RF noise power so that the network can adjust to the noise, to the extent possible. The measurements are typically logged into a network management system, which can be used to generate reports that can be used by the network management team to identify which sites are most interfered. Thus, such interference identifying features may identify interference that is occurring to individual cells, but do not include features to assist in the global management of interference. Conventional reporting systems report the noise standard of one interfered cell at a time, and can be used to provide an overall report of worst interfered cells. This is the minimum necessary to dispatch crews to find and fix the interference. This type of system is limited in several abilities including, for example, such a system does not provide: a means to classify specific types of repeating interferers, a means to track interference levels over the entire network, a way to prioritize single interference sources that impact large geographical regions, a way to see the impact of network configuration changes to interference levels across the network, or a simple means to generate interference complaint documentation.

SUMMARY

Embodiments of the invention include features to provide for the tracking, identification, location and repair of interference sources in a network.

According to a first aspect, there is presented a method for managing interference in a wireless communication network. The method includes a network management server receiving measurement data from a plurality of measurement devices in the network. The server processes the measurement data to detect interference of one or more of a plurality of interference types in the network and to generate pattern characterization data that characterizes the detected signal patterns. The server receives a user selection of a signal pattern type and selects, in response to the user selection and for display to the user, pattern characterization data that characterizes signals of the selected signal pattern type.

In an embodiment according to the first aspect, the detected signal patterns are associated with interference and the pattern characterization data includes a severity level of the interference. The severity level of the interference may be obtained based on an amplitude parameter associated with the interference and a number of times signal patterns associated with the interference are detected over a predetermined period of time.

In an embodiment according to the first aspect, processing the measurement data to detect signal patterns includes comparing the pattern characterization data to one or more predetermined signal pattern variables.

In an embodiment according to the first aspect, the method includes graphically displaying the pattern characterization data on an interactive map. An interface may receive a user selection of a geographic area and/or a time window of interest for analyzing pattern characterization data.

According to a second aspect, there is presented a network management server operable to perform the method embodiments according to the first aspect.

Advantageously, the disclosed methods and systems allow for a network management user to see where different types of interference are on a map and which cells or sectors are affected by the interference. The disclosed methods and systems also facilitate performance management and interference mitigation. For example, the pattern characterization data can be used to:

determine if interference is improving or worsening over time and across an entire network, help identify interference problems that are repetitive, help verify if interference sources are being fixed in a timely fashion, show if a configuration change has impacted the network, provide an input for future interference management budgets, and help prioritize types of cases in terms of severity and duration for specific types of interference.

In terms of mitigating interference, the disclosed methods and systems advantageously:

serve as a knowledgebase containing information to help start a repair effort, provide rapid geographic identification of interference sources thereby reducing time needed to mitigate the interference, simplify the creation of reports that formulate interference complaints to governmental regulating bodies such as the FCC and/or owners of interfering devices, and can be used by less experienced personnel.

It is to be noted that any feature of the first aspect may be applied to the second aspect, wherever appropriate. Likewise, any advantage of the second aspect may equally apply to the first aspect, respectively, and vice versa. Other objectives, features and advantages of the enclosed embodiments will be apparent from the following detailed disclosure, from the attached dependent claims as well as from the drawings.

BRIEF DESCRIPTION OF THE DRAWINGS

The drawings illustrate selected embodiments of the disclosed subject matter. In the drawings, like reference labels denote like features.

DETAILED DESCRIPTION

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Conventional interference analysis solutions fail to adequately provide a broad view of different types interference and which cells in a network are affected by the different types. For example, a conventional solution may receive various diagnostic measurements in a network and produce a visual representation of problems in the network, but does not allow a user to quickly identify where in the network or what time of day a particular type of interference is occurring.

Accordingly, in consideration of these and other shortcomings of existing technologies, certain embodiments of the disclosed subject matter facilitate selection of signal pattern type by a user and displaying data that characterizes the selected signal pattern type to the user, e.g., on a table or an interactive map.

Figure 1:
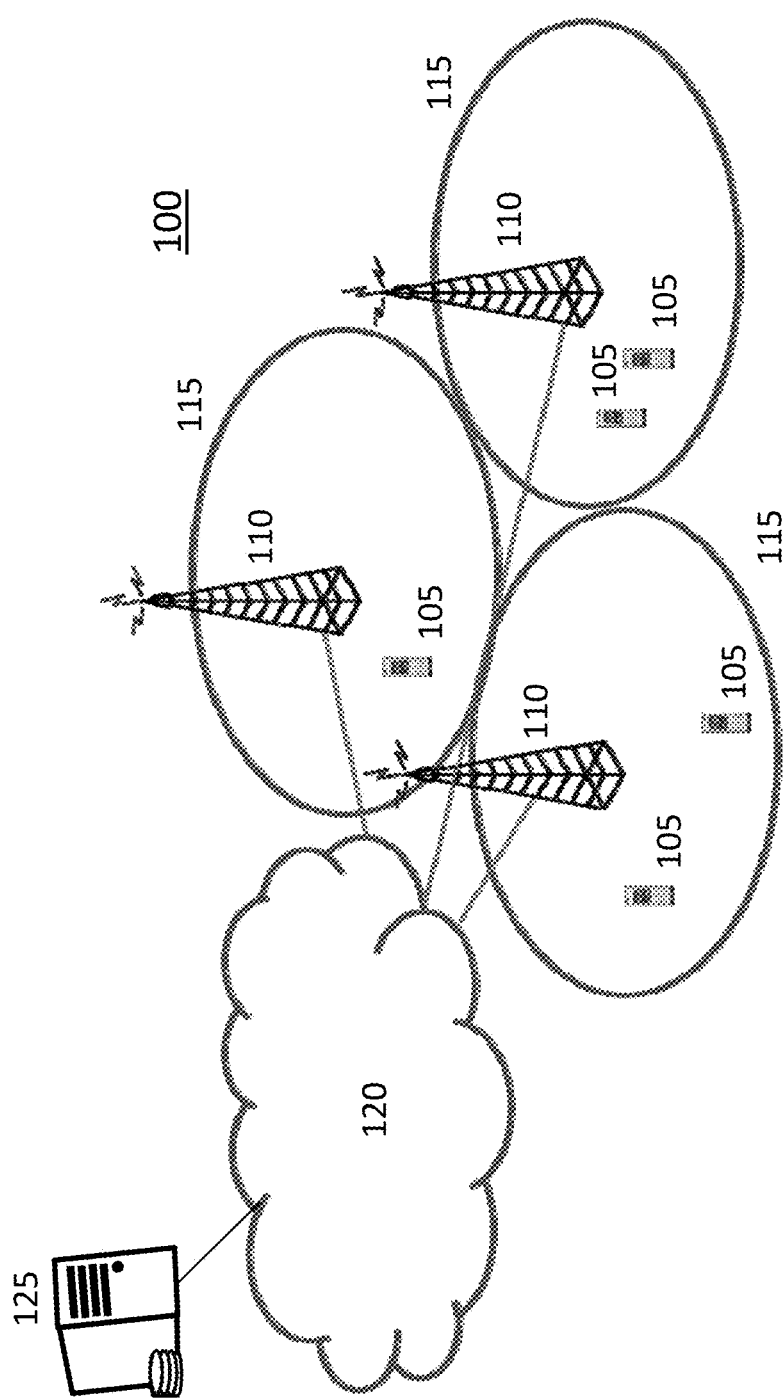
FIG. 1 illustrates a wireless communications network environment in which embodiments of the disclosed subject matter operate.

FIG. 1 illustrates according to an embodiment of the disclosed subject matter. The described embodiments may be implemented in any appropriate type of communication system supporting any suitable communication standards and using any suitable components. As one example, certain embodiments may be implemented in or for analysis of interference in a wireless communication network 100 such as that illustrated in FIG. 1. The communication network 100 is a cellular communications network (e.g., a Long Term Evolution (LTE) network, a Universal Mobile Telecommunications Service (UMTS) network, or a 5G New Radio (NR) network) and, as such, sometimes referred to herein as a cellular communications network 100.

The communication network 100 comprises a plurality of wireless communication devices 105 (e.g., conventional UEs, Machine Type Communication (MTC)/Machine-to-Machine (M2M) UEs) and a plurality of radio access nodes 110 (e.g., eNBs or other base stations). The wireless communication devices 105 are also referred to herein as wireless devices 105 or UEs 105. The communication network 100 is organized into cells 115, which are connected to a core network 120 via corresponding radio access nodes 110. The radio access nodes 110 are capable of communicating with the wireless communication devices 105 along with any additional elements suitable to support communication between the wireless communication devices 105 or between a wireless communication device 105 and another communication device (such as a landline telephone). A network management server 125 is connected to the core network 120 and communicates management data to and/or from various nodes in the network including, e.g., the radio access nodes 110, through the core network 120.

Interference Analysis Methods

Figure 2:
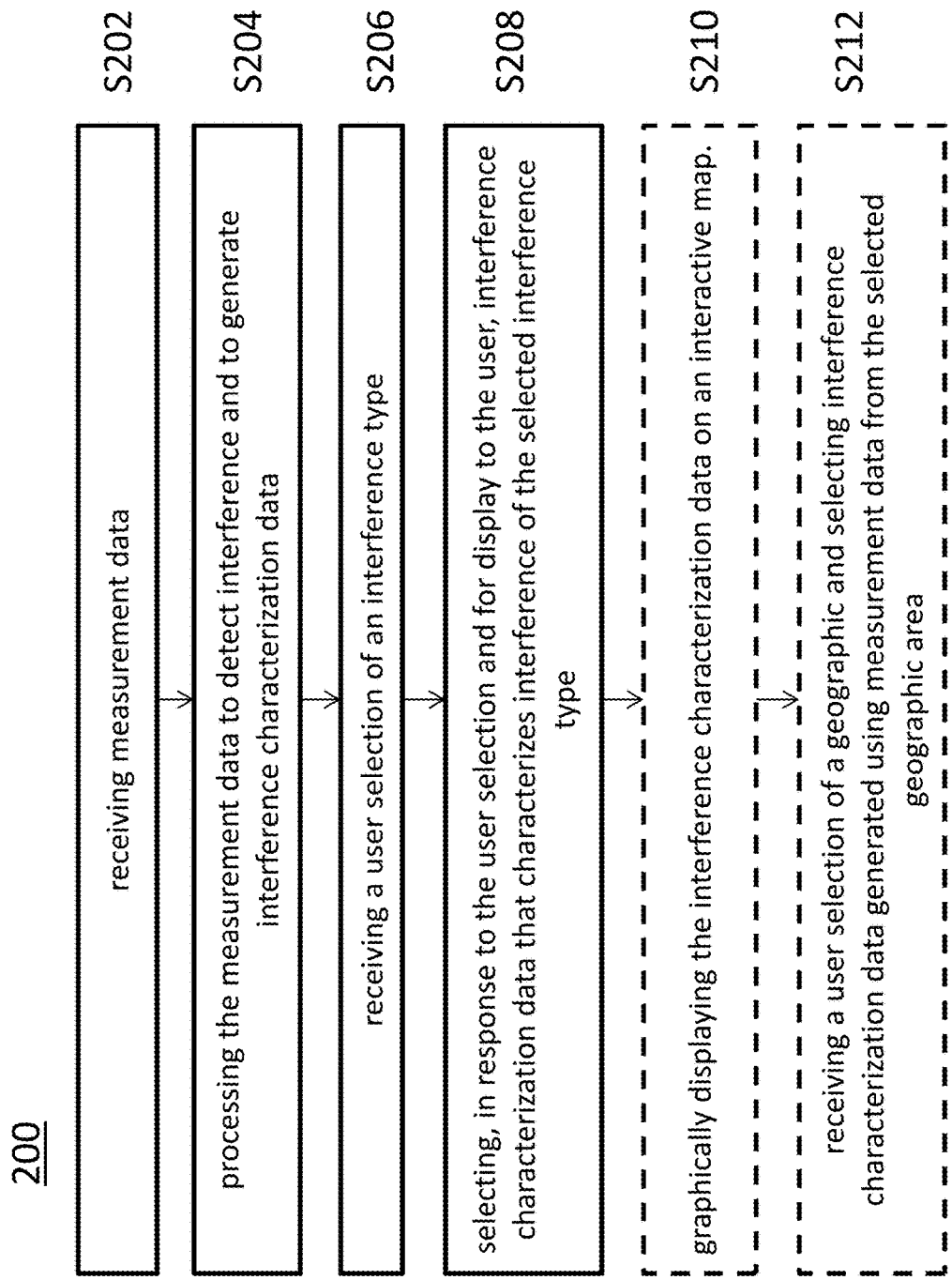
FIG. 2 is a flowchart of a method according to an embodiment of the disclosed subject matter.

FIG. 2 illustrates a flowchart of a method 200 for operating a network management server, such as network management server 125, in a wireless communication network, such as communication network 100, to facilitate analysis of interference in the network. The network management server implementing method 200 may be a server located remotely from one or more client terminals. The one or more client terminals may receive queries from network managers/operators and may and provide network management reports, including interference analysis reports, using data retrieved from the server in response to the queries. The network management server is described in further detail below with reference to FIG. 3.

In step S202 of method 200, the server receives measurement data from a plurality of measurement devices in the network. The measurement devices may be co-located with radio base stations in the network. Alternatively, or in addition, the measurements devices may include standalone devices and/or may include wireless devices for which the network provides services. Moreover, the measurement data may include raw measurement data and/or may have some minor processing performed prior to receipt by the server. For example, the measurement data may be compiled, tabulated, filtered, and/or smoothed, etc.

The measurement data may be accompanied by or may include additional data, such as time-stamp characterizing a time of measurement and/or location data characterizing a location of measurement. The additional data may also include configuration data, which may include logical base station identifier information, uplink frequency channel numbers, channel bandwidths, design data (e.g., antenna models, antenna tilts, and radio equipment parameters, such as radio equipment model number), and physical site data (e.g., location data including latitude/longitude coordinates and ground elevation, and antenna height and azimuths).

In step S204, the server processes the measurement data to detect signal patterns of one or more of a plurality of signal pattern types in the network and to generate signal pattern characterization data that characterizes the detected signal patterns. Detection of signal patterns may include comparing the received measurement data to one or more predetermined signal pattern variables. The one or more predetermined signal pattern variables correspond to the one or more plurality of signal pattern types. Various different signal patterns or types are described in detail further below under the "Predetermined Signal Patterns" subheading.

In certain embodiments, the detected signal patterns are associated with interference and the pattern characterization data includes a severity level of the interference. The severity level of the interference, also referred to as a score, may be obtained based on an amplitude parameter associated with the interference and a number of times the interference is detected over a predetermined period of time, e.g., an hour, a day, a week, etc. The amplitude parameter may vary depending on the type of interference. For example, interference characterized with peaks may be scored based on a peak amplitude of the interference relative to a threshold value. For other types of interference, the amplitude parameter is a sum of a plurality of amplitude values of the interference. For example, for a Digital Enhanced Cordless Telecommunications (DECT) type of interference, the amplitude parameter may be a sum of amplitude values across multiple peaks. In certain embodiments, each of the amplitude values may be compared to a threshold value to determine whether it qualifies as a peak for purposes of determining whether it should be included in the sum. Moreover, the amplitude values may be considered for each of a plurality of physical resource block of an LTE subframe. In one embodiment, amplitude values for all physical resource blocks of the LTE subframe are measured while in other embodiments only a subset of the physical resource blocks of the subframe are considered. In another embodiment, the amplitude parameter is an average of a plurality of amplitude values or other suitable signal level measurements.

In step S206, the server receives a user selection of a signal pattern type. The user selection may be obtained via a remote client terminal that is communicatively coupled to the server. The signal pattern type may be a selected from a list of possible options. For example, a user interface at the server or a remote client terminal may display a list of signal pattern types from which the user may select at least one that is of interest.

In step S208, the server selects, in response to the user selection and for display to the user, pattern characterization data that characterizes the detected signal patterns of the selected pattern type. Thus, the server and its method facilitate tracking interference levels for particular types of interference over an entire network, facilitate the prioritization of individual interference sources that impact large geographical regions, and facilitate generation of interference complaint documentation. Moreover, when network configuration changes are made, a user is able to easily view the impact of such changes to interference levels across the network by comparing the pattern characterization data both before and after the network configuration changes.

In step S210, which may be optionally performed by the server, the pattern characterization data is graphically displayed on an interactive map. In certain embodiments, the user input is obtained via a client terminal and the server sends the selected pattern characterization data to the client terminal to be graphically display at the terminal on an interactive map. Thus, the server may be said to graphically display pattern characterization data even when it is merely sending data to a remote client terminal be displayed by the remote client terminal to a user. Moreover, pattern characterization data may be displayed in forms other than an interactive map including, e.g., graphs, tables, charts of direct measurements over time and/or pattern characterization data, or any other format that facilitates identifying impact of interference to the network or to facilitate identification of other signatures related to an interference source.

In step S212, which may also be optionally performed by the server, a user selection of a geographic area is received and the selection of pattern characterization data includes selecting pattern characterization data generated using measurement data received from measurement devices in the selected geographic area. The geographic area may be a particular cell and/or sector or a group of cells and/or sectors.

Method 200 is provided by way of example for illustration purposes. Other embodiments are contemplated in which certain steps are added, omitted, and/or arranged in a different order. For example, step S206 may precede one or both of steps S202, S204. Moreover, additional steps may be added, such as receiving a user selection of a time window of interest and limiting the selected pattern characterization data to data corresponding to the selected time window.

Figure 3:
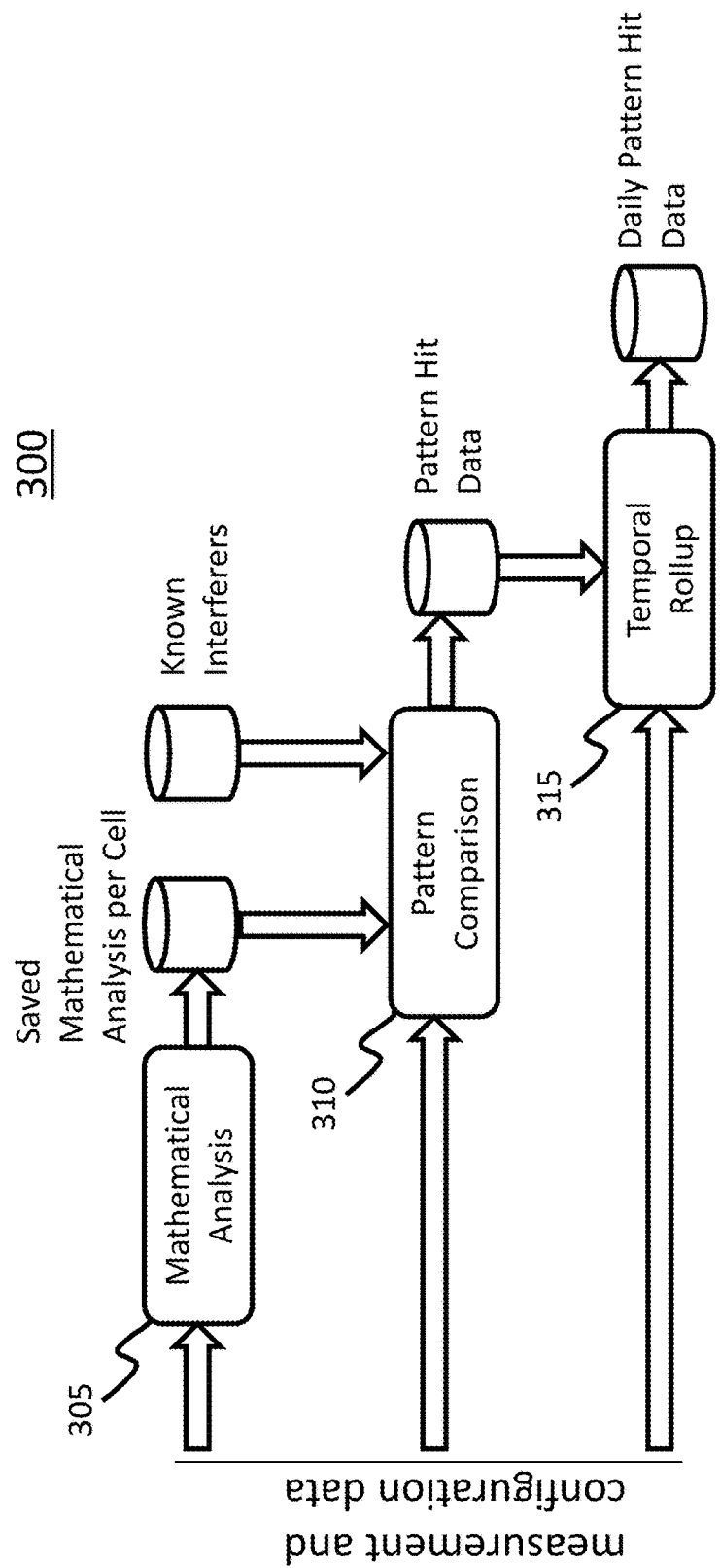
FIG. 3 illustrates a functional block diagram of a network management server according to an embodiment of the disclosed subject matter.

FIG. 3 illustrates a high level functional block diagram of a network management server 300 operable to receive measurement data from a network, among other sources, analyze the measurement data, and provide pattern characterization data and associated reporting in a wireless communications network. The mathematical analysis functional block 305 receives measurement and configuration data and processes the measurement data to prepare it for processing by a subsequent pattern comparison functional block 310. The measurement data may be raw measurement data received from various nodes in the network (or may be nominally processed measurement data) and may include or be accompanied by configuration data, as discussed above. The received data may be stored in a database or like storage and may be indexed according to cell and/or sector and time. The mathematical analysis may be performed on measurement data corresponding to a defined number of physical resource blocks (PRBs) of an LTE subframe (or similar resources in a UMTS subframe) to represent a finite sample of measurements. Mathematical analysis functional block 305 may perform certain statistical calculations on the sample measurements, including, e.g.:

average
standard deviation
skew
kurtosis
best line fit
slope of best line fit
coefficient of determination (R squared)
delta of the maximum and minimum values
roughness analysis In addition, certain specific variables having special significance may be recorded for use in pattern comparison queries. Such variables may include, for example, a number of PRBs in a subframe or set of subframes with signal strength measurements above a predetermined threshold, a generic directional bias value of signal strength measurements (e.g., tendency to increase or decrease) over a predetermined or selectable period of time, a maximum RSSI observed in a subframe or set of subframes, a minimum RSSI observed in the subframe(s), an indication or identifier of a PRB of the subframe(s) in which the maximum RSSI is observed, and/or an indication or identifier of a PRB of the subframe(s) in which the minimum RSSI is observed. The output of the mathematical analysis functional block 305 may be saved temporarily, e.g., in a database, for pattern comparison queries. The pattern comparison functional block 310 compares the saved mathematical analysis data to known signal patterns or, more specifically, to known signal pattern variables. The comparison may be performed using the measurement data, configuration data, and predetermined signal pattern variables that are stored, e.g., in a database or like storage, to determine whether the predetermined signal pattern variables correspond sufficiently to characteristics of the measurement data produced by the mathematical analysis block 305. The determination of whether a sufficient correspondence is achieved may be dependent on the particular type of signal pattern being tested for. For example, certain types of interference are characterized by certain statistical aspects. Therefore, if a certain statistic, such as average amplitude of signal strength, of a set of measurement data matches (e.g., is within a threshold tolerance of proximity to) a predetermined statistic that a certain type of interference is known for then the pattern comparison block 310 may detect a pattern hit, i.e., determine that the set of measurement data is generated by or corresponds to that certain type of interference.

Pattern hits are tallied by the pattern comparison block 310 and the tallies are fed to a temporal rollup functional block 315. In addition, pattern hit data and, optionally, other associated data, is stored in a database and is made accessible to the temporal rollup functional block 315 for data mining queries. The temporal rollup functional block 315 compiles running tallies of pattern hits that are found for a plurality of different signal pattern types over a predetermined window of time (e.g., hourly, daily, or weekly) based on the patterns hit data and configuration data. The resulting tallies are stored in a database, spreadsheet, table, or like storage as daily (and/or hourly, weekly, etc.) pattern hit data and are indexed according to cell and/or sector and time for data mining queries. The daily pattern hit data and other pattern characterization data (including, in certain embodiments, the pattern hit data output by the pattern comparison block 310, and the saved mathematical analysis per cell data output by the mathematical analysis block 305) is accessible by a user to produce interference analysis reports that show where various different types of interference are occurring in the network. Moreover, based on the tallies of the daily pattern hit data, the temporal rollup block 315 may generate severity levels of the respective types of interference. The severity levels may be based on the daily pattern hit data and saved mathematical analysis data including, for example, certain statistics that characterize the interference. The saved mathematical analysis used to determine severity levels may differ depending on the particular type of interference but may include an amplitude parameter, e.g., a peak amplitude, a sum of amplitude values, an average of a plurality of amplitude values, or another suitable signal level measurement(s) that may be measured across all or a subset of PRBs of an LTE subframe.

Graphical User Interfaces

Figure 4:
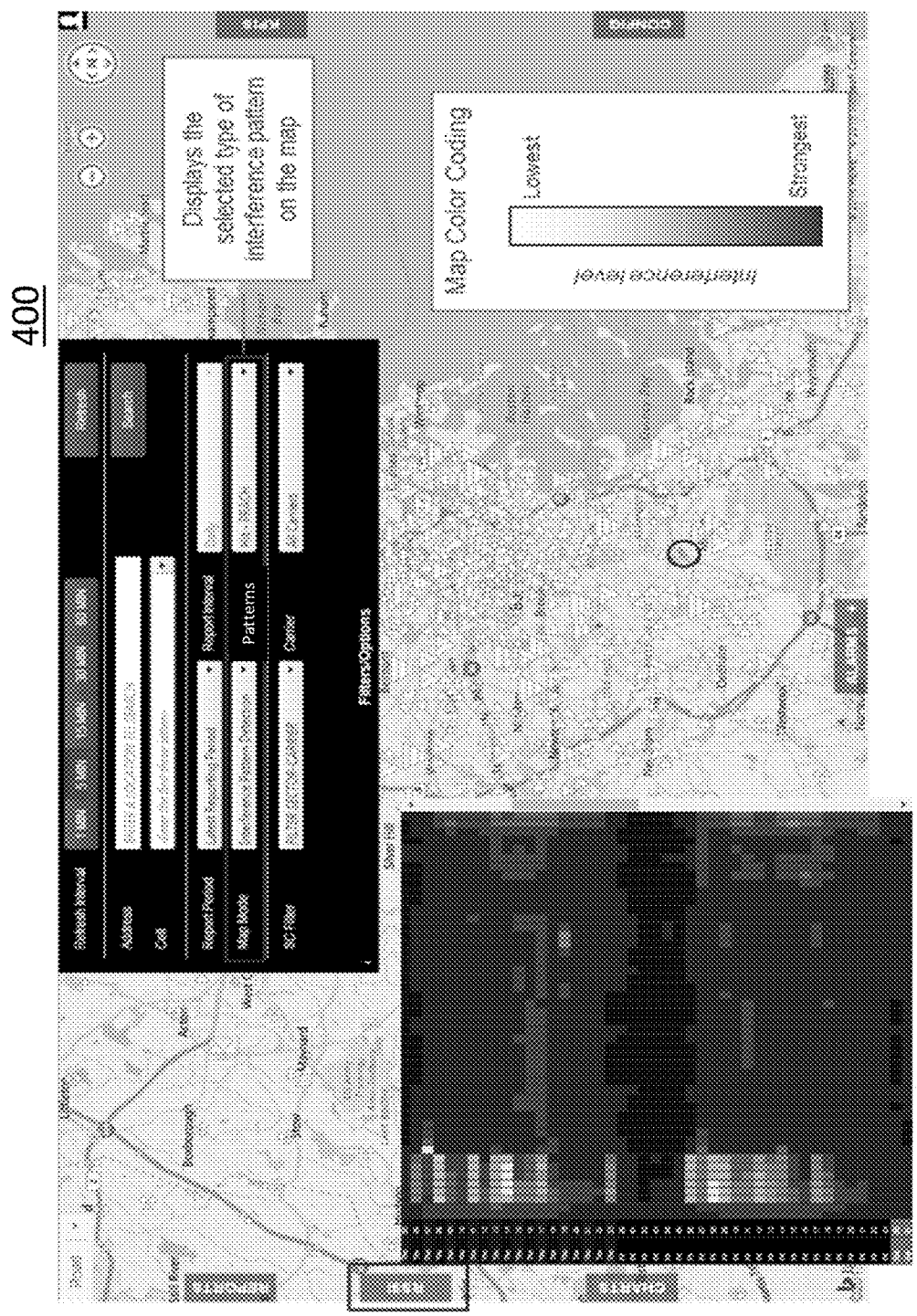
FIGS. 4-6B illustrate various different graphical user interfaces according to an embodiment of the disclosed subject matter.

FIG. 4 illustrates a first graphical user interface 400 provided by the network management server 300 or a client terminal that interfaces with the network management server 300. As illustrated in FIG. 4, a graphical user interface may display a severity of interference on a map of cells and sectors using, e.g., a color coding scheme. Moreover, the interface 400 (or another interface used to generate the interface 400) includes a menu option for a user to select a signal pattern type of interest, e.g., using a drop-down selection menu. The interface may also provide options for the user to select a refresh interval at which the displayed interference should be refreshed, to select a particular cell or address of interest to be displayed on the map, and to select a period of time or "report period" for which interference is to be displayed (e.g., a latest reporting period or any one of a plurality of previous reporting periods).

Figure 5:
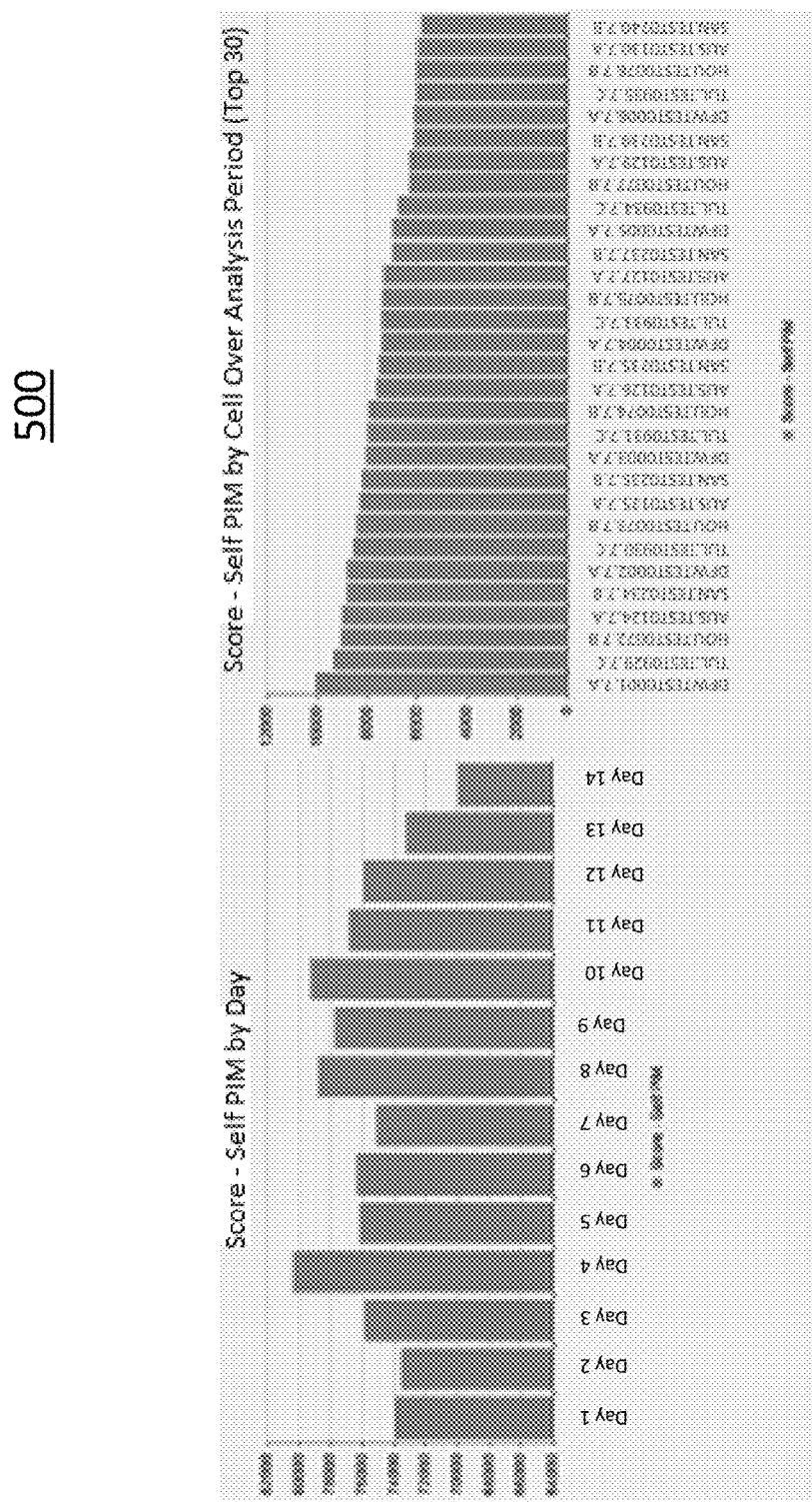

FIG. 5 illustrates a second graphical user interface 500 provided by the network management server 300 or a client terminal that interfaces with the network management server 300. The interface 500 includes an interference dashboard that displays trends across a market of geographical area over a period of multiple days for a selected type of interference. Moreover, the interference dashboard displays a number of hits for each of the worst predetermined number (30 in the example shown) of signal pattern types over the course of a selected analysis period. Such reports may be useful to check if certain types of interference are increasing or decreasing over time and to identify the "worst offenders," i.e. the interference types being detected the most.

Figure 6A:
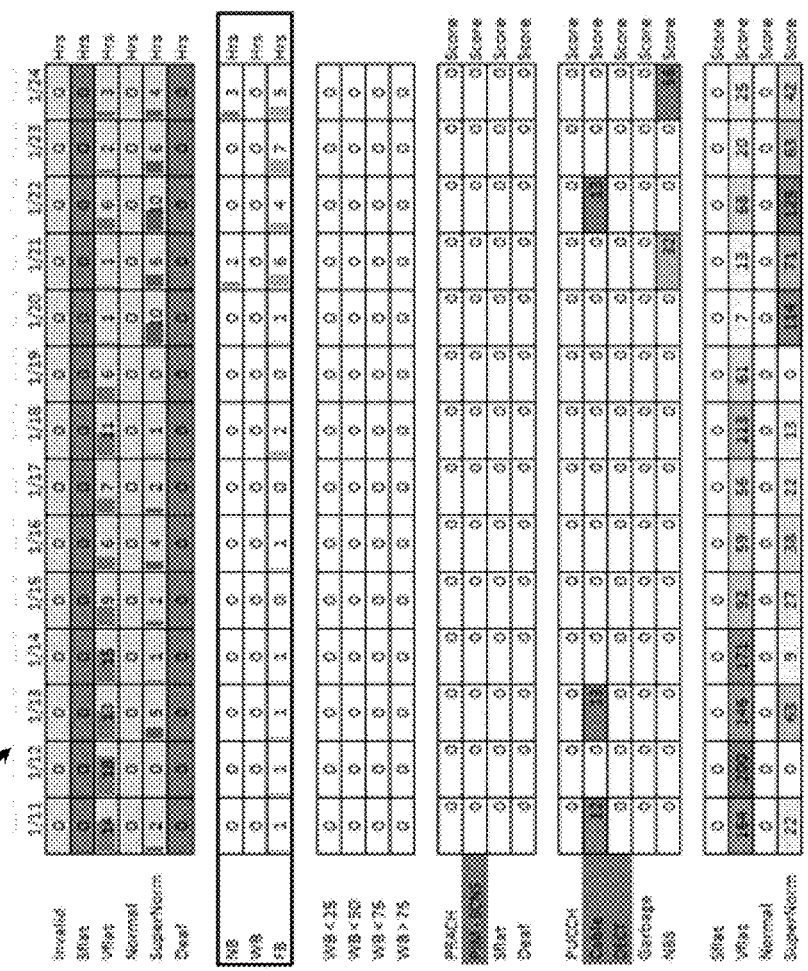
Figure 6A:
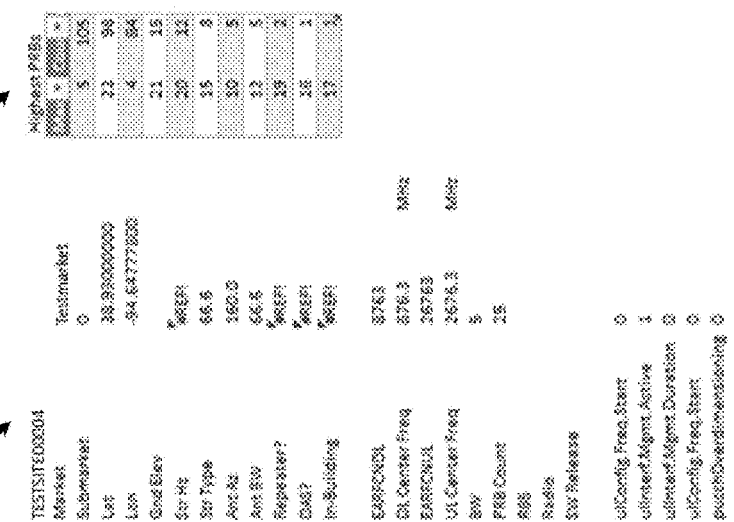
Figure 6B:
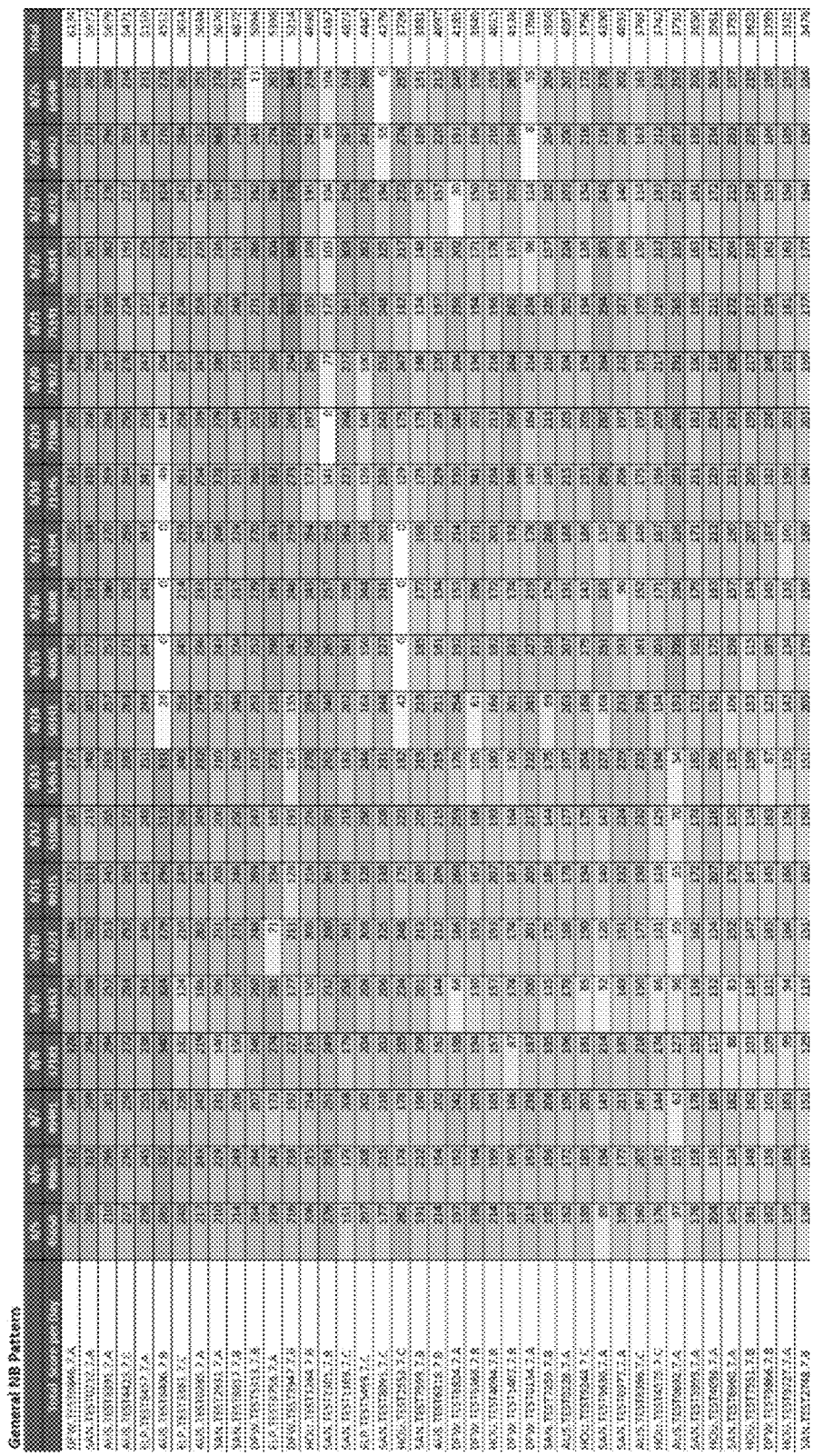

FIGS. 6A and 6B illustrate additional graphical user interfaces 600a, 600b provided by the network management server 300 or displayed by a client terminal that interfaces with the network management server 300. Referring to FIG. 6A, the interface 600a (or another interface used to generate the interface 600a) includes menu options, e.g., using drop-down selection menus, for a user to select a particular cell of interest. The interface may also include options to facilitate selection of a plurality of signal pattern types. The interface 600a displays tables of pattern characterization data for certain pattern types (which may be user selectable) and the selected cell over a period of time (e.g., days). The numbers in the table 605 represent a number of pattern hits detected for a certain pattern on a certain day. For example, in the first column, third row of table 605, the number 14 represents 14 pattern hits detected for the Vflat (very flat) pattern on January 11. Each of the 14 pattern hits was detected in a different one hour window of the day. The pattern characterization data can also be expressed as a score or severity level that depends on a number of pattern hits over a period of time and an amplitude parameter. The particular criteria used for tallying the score may vary depending on the type of pattern being detected.

The interface 600a also includes a table 610 of cell specific configuration data for the cell whose pattern characterization data is depicted in the table 605. In addition, the interface 600a includes a table 615 that lists an indication of PRBs for which a maximum RSSI was observed over an observation period and the number of times over the period for which the indicated PRB's RSSI was maximum. A comparison to multiple patterns may be needed to identify a specific interference type. For example, multiple interferers may be identified by a pattern hit, but one particular interferer may be prevalent on, say, PRB 10. The peak PRB information in table 615 may therefore be used as an additional filter to identify a source of interference.

Referring to FIG. 6B, the interface 600b includes a table of daily scores for each of a plurality of cells. Each row of the table corresponds to a cell identified on the far left column. Each column corresponds to a different day in an observation period. The right-most column lists a total score (ordered in descending scores) for each cell totaled over the observation period. The score for each cell on each day is a sum of individual scores each corresponding to a different type of interference detected. Each entry in the table is shaded according to its score, thereby giving a user a convenient overview of interference problems detected in an entire group of cells of interest.

Predetermined Signal Patterns

As discussed above, the pattern comparison block 310 may compare saved mathematical analysis data to known signal patterns or, more specifically, to predetermined signal patterns of known signal pattern types, to detect pattern hits. The signal pattern types may be categorized under general flat pattern types, general shape pattern types, or specific pattern types. Moreover, measurement samples used to detect interference types can be selected from PRBs in particular channels (e.g., a PUCCH or a PUSCH). General flat pattern types may include, for example:

super flat patterns—patterns in which absolutely no variation is found from one signal strength (e.g., PRB RSSI) measurement to the next; a super flat pattern might be detected where the received noise level is above the ability of the receiver to measure the noise, so that all signal strength measurements are reported at their peak limit; a super flat pattern may be defined as a pattern where the difference between the maximum and minimum PRB RSSI measurements of a sample spanning a period of time is zero (in one embodiment the PRB RSSI measurements are averaged over a period that may range, e.g., from 15 minutes to an hour, and the average PRB RSSI measurements are compared to identify maximum and minimum PRB RSSI measurements);

very flat patterns—patterns in which a very limited variation is found from one signal strength measurement to the next, and a limited total difference; a very flat pattern may be an indication of very little traffic on the system, or that an external system is artificially raising the noise floor; a very flat pattern may be defined as a pattern where the difference between the maximum and minimum PRB RSSI measurements of a sample spanning a period of time is greater than zero and less than or equal to 2;

normal patterns—patterns in which signal strength measurement variations fall within a normal range, i.e., a range in which most normally functioning sites will fall; a normal pattern may be defined as a pattern where the difference between the maximum and minimum PRB RSSI measurements is less than or equal to 5 dB and the average of all PRBs is less than or equal to half the difference between the maximum and minimum PRB RSSI measurements;

supernormal patterns—patterns that have higher than normal, but uniformly shaped, signal strengths across the PRBs in a PUSCH range of the PRBS; a supernormal pattern may be defined as a pattern where the difference between the maximum and minimum PRB RSSI measurements is less than or equal to 10 dB, the average of all PRB RSSI measurements is less than or equal to half the difference between the maximum and minimum PRB RSSI measurements; and the first and last PRB RSSI measurements are greater than the average of all PRB RSSI measurements in the subframe (although normal and supernormal patterns are not "interference" patterns it is generally helpful to recognize the absence of interference when detecting different interference and therefore such patterns may be considered signal pattern types of interest for the pattern comparison function);

garbage patterns—patterns that have a fairly narrow difference between the maximum and minimum signal strength measurements, but have a lot of variation from one signal strength measurement to the next; a garbage pattern may be defined as a pattern where the difference between the maximum and minimum PRB RSSI measurements is less than or equal to 12 dB and the calculated "roughness" of a sample of PRB RSSI measurements is greater than a limit which depends on the number of PRBs in the sample.

General shape interference types differ from general flat pattern types in that they are intended to identify general shapes in a sample of signal strength measurements. General shape pattern types may include, for example:

general narrow band patterns—patterns in which less than a few (e.g., five) signal strength measurements in a sample exceed a predetermined level (in one example embodiment the predetermined level is −110 dBm, but a warning level of −114 dBm may also be used);

general wide band patterns—patterns in which less than all but more than a few (e.g., five) signal strength measurements in a sample exceed the predetermined level;

general full band patterns—patterns in which all signal strength measurements in a sample exceed the predetermined level.

Specific interference types may be specific to certain types of known interference sources for which frequency plan information is publicly available. Such specific interference types may include, for example:

cable TV patterns—patterns produced as RF energy leaks due to certain defects in cable TV systems; such leaks can cause interference to cellular telephone systems operating within the frequency range of the cable TV system.

DECT patterns—patterns produced by DECT systems; DECT is an ETSI standard for limited digital wireless communications and is often used for residential and commercial cordless phones, baby monitors, doorbells, and other similar applications; DECT systems are frequency coordinated for use in specific nations, and can cause cellular interference in the 1800-1900 MHz band when improperly imported into countries for which they are not allowed.

passive intermodulation patterns—patterns that are attributable to radio noise caused by the cellular systems' own RF energy mixing at defects in the radio/antenna/feedline system and falling back into the cellular system receivers; the shape of the noise can depend on many factors, including: where in the system the hardware defect is located, how many technologies are active, how many transmitters are operating, what specific frequencies are in operation, and/or how much power is transmitted on each frequency; accordingly, separate patterns may need to be specifically defined to capture particular problematic combinations.

Physical Random Access Channel (PRACH) patterns—patterns intended to identify systems in which abnormal amounts of user traffic are occurring on the six PRBs that are typically reserved for random access channel traffic; the exact cause for this is unknown, but is believed to result from a specific configuration of the cellular system.

Physical Uplink Control Channel (PUCCH) patterns—patterns attributable to interference on the PUCCH PRBs, where no (or at least minimal) noise is seen in the PUSCH PRBs.

The foregoing list of patterns is given by way of illustration and is not intended to be exhaustive. Additional patterns and specific sub-patterns or more general patterns are also contemplated. Moreover, in one embodiment an option may be provided for a user to define a specific interference pattern or shape of interest.

Hardware and Software Embodiments

Figure 7:
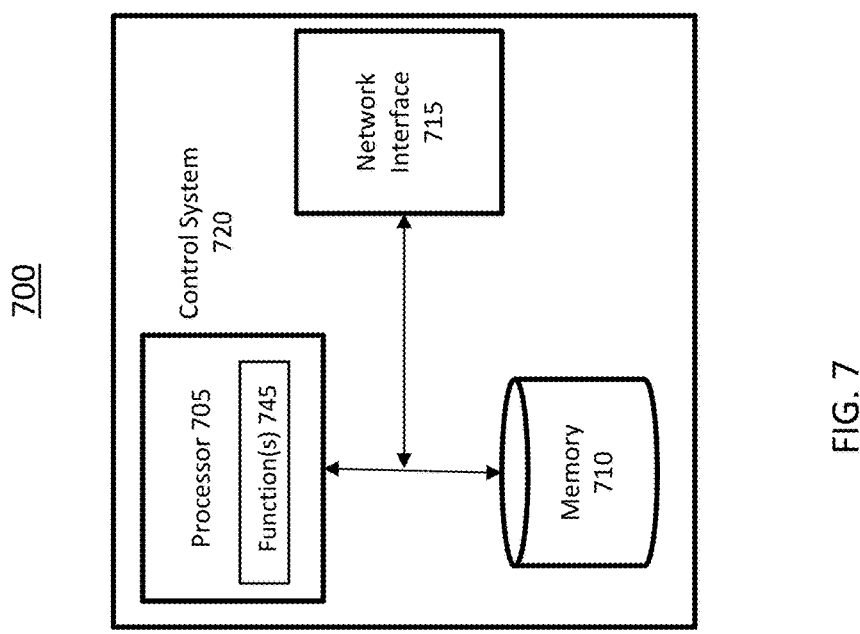
FIG. 7 illustrates a hardware block diagram of a network management server according to an embodiment of the disclosed subject matter.

FIG. 7 illustrates a hardware block diagram of the network management server 700 that corresponds to the network management server 300 depicted functionally in FIG. 3. Referring to FIG. 7, a server 700 comprises a control system 720 that comprises a processor 705 (e.g., Central Processing Units (CPUs), Application Specific Integrated Circuits (ASICs), Field Programmable Gate Arrays (FPGAs), and/or the like), memory 710, and a network interface 715. Processor 705 operates to provide at least one function 745 of server 700 as described herein. In some embodiments, the function(s) are implemented in software that is stored, e.g., in the memory 710 and executed by processor 705. Network interface 715 operates to provide processor 705 access to the necessary measurements, configuration settings, and other data needed to carry out its network management functions. Moreover, network interface 715 operates to provide remote access by a client terminal (not shown) operated by a network management user to facilitate selection of pattern types, geographic locations, time windows, etc. to be used in generating pattern characterization data and to obtain data used to display graphical representations of such pattern characterization data at the remote client terminal.

In certain embodiments, some or all of the functionality described as being provided by a network management server may be provided by processor 705 executing instructions stored on a computer-readable medium, such as memory 710 shown in FIG. 7. Alternative embodiments of server 700 may comprise additional components to provide additional functionality, such as the functionality described herein and/or related supporting functionality.

In some embodiments, a computer program comprises instructions which, when executed by at least one processor, causes the at least one processor to carry out the functionality of a network management server according to any of the embodiments described herein. Similarly, in some embodiments, a computer program comprises instructions which, when executed by at least one processor, causes the at least one processor to carry out the functionality of a network management server or client terminal implementing one or more of the functions of the network management server or client terminal in a virtual environment according to any of the embodiments described herein.

Figure 8:
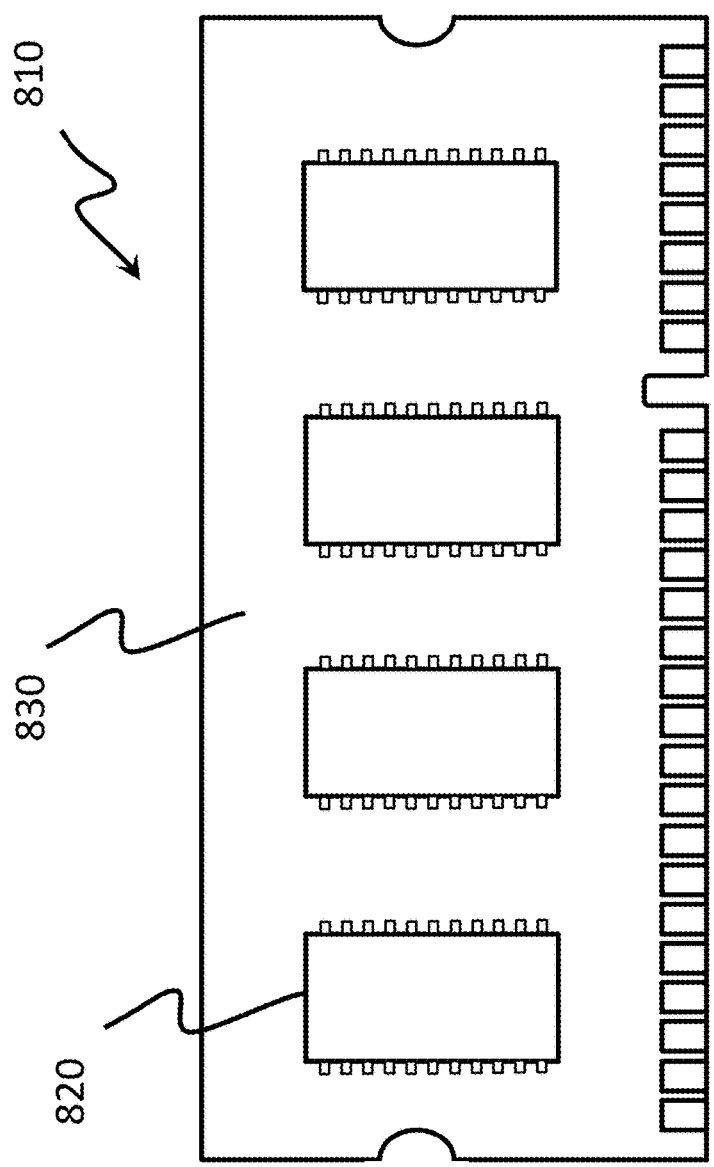
FIG. 8 shows one example of a computer program product comprising computer readable means according to an embodiment.

FIG. 8 shows one example of a computer program product 810 comprising computer readable means 830. On this computer readable means 830, a computer program 820 can be stored, which computer program 820 can cause the processor 705 and thereto operatively coupled entities and devices, such as the network interface 715 and the memory 710, to execute methods according to embodiments described herein. The computer program 820 and/or computer program product 810a may thus provide means for performing any steps of the network management server as herein disclosed.

In the example of FIG. 8, the computer program product 810 is illustrated as a random access memory (RAM) chip. The computer program product 810 could also be embodied as a memory, such as a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as stored in a RAM chip, the computer program 820 can be stored in any way which is suitable for the computer program product 810.

While the disclosed subject matter has been presented above with reference to various embodiments, it will be understood that various changes in form and details may be made to the described embodiments without departing from the overall scope of the disclosed subject matter.

The invention claimed is:

1. A method for managing interference in a wireless communication network, the method comprising:
   receiving measurement data from a plurality of measurement devices in the network;
   processing the measurement data to detect signal patterns of one or more of a plurality of signal strength pattern types in the network and to generate pattern characterization data that characterizes the detected signal strength patterns, each of the signal strength pattern types corresponding to a different type of interference;
   receiving a user selection of a signal strength pattern type; and
   selecting, in response to the user selection and for display to the user, pattern characterization data that characterizes signals of the selected signal strength pattern type.

2. The method of claim 1, wherein the pattern characterization data includes a severity level of the interference.

3. The method of claim 2, wherein the severity level of the interference is obtained based on an amplitude parameter associated with the interference and a number of times signal strength patterns associated with the interference are detected over a predetermined period of time.

4. The method of claim 3, wherein the amplitude parameter is based on a peak amplitude of the interference relative to a threshold value.

5. The method of claim 3, wherein the amplitude parameter is based on a sum of a plurality of amplitude values of the interference.

6. The method of claim 1, wherein processing the measurement data to detect signal patterns includes:
   comparing the pattern characterization data, generated from the received measurement data, to one or more predetermined signal pattern variables.

7. The method of claim 1, further comprising graphically displaying the pattern characterization data on an interactive map.

8. The method of claim 1, further comprising receiving a user selection of a geographic area, wherein selecting the pattern characterization data includes selecting pattern characterization data generated using measurement data received from measurement devices in the selected geographic area.

9. The method of claim 8, further comprising receiving a user selection of a time window of interest, wherein selecting the pattern characterization data includes selecting pattern characterization data corresponding to the selected time window.

10. A network management server for providing interference analysis reports, the server comprising:
    a processor; and
    memory containing instructions that, when executed by the processor, cause the server to:
    receive measurement data from a plurality of measurement devices in the network;
    process the measurement data to detect signal strength patterns of one or more of a plurality of signal strength pattern types in the network and to generate pattern characterization data that characterizes the detected signal strength patterns, each of the signal strength pattern types corresponding to a different type of interference;
    receive a user selection of a signal strength pattern type; and
    select, in response to the user selection and for display to the user, pattern characterization data that characterizes signals of the selected signal strength pattern type.

11. The server of claim 10, wherein the pattern characterization data includes a severity level of the interference.

12. The server of claim 11, wherein the severity level of the interference is obtained based on an amplitude parameter associated with the interference and a number of times signal strength patterns associated with the interference are detected over a predetermined period of time.

13. The server of claim 12, wherein the amplitude parameter is based on a peak amplitude of the interference relative to a threshold value.

14. The server of claim 12, wherein the amplitude parameter is based on a sum of a plurality of amplitude values of the interference.

15. The server of claim 10, wherein the instructions contained in the memory further cause the processor to process the measurement data to detect interference by:
   comparing the pattern characterization data, generated from the received measurement data, to one or more predetermined signal pattern variables.

16. The server of claim 10, wherein the instructions contained in the memory further cause the processor to graphically display the pattern characterization data on an interactive map.

17. The server of claim 10, wherein the instructions contained in the memory further cause the processor to receive a user selection of a geographic area, wherein selection of the pattern characterization data includes selection of pattern characterization data generated using measurement data received from measurement devices in the selected geographic area.

18. The server of claim 17, wherein the instructions contained in the memory further cause the processor to receive a user selection of a time window of interest, wherein selection of the pattern characterization data includes selection of pattern characterization data corresponding to the selected time window.

\* \* \* \* \*